United States Patent [19]

Isobe

[11] 4,168,456
[45] Sep. 18, 1979

[54] APPARATUS FOR CONTROLLING AN ELECTRIC MOTOR FOR DRIVING A COOLING FAN OF AN INTERNAL COMBUSTION ENGINE

[75] Inventor: Toshiaki Isobe, Nagoya, Japan

[73] Assignee: Toyota Jidosha Kogyo Kabushiki Kaisha, Aichi, Japan

[21] Appl. No.: 832,010

[22] Filed: Sep. 9, 1977

[30] Foreign Application Priority Data

May 9, 1977 [JP] Japan .................................. 52-51998

[51] Int. Cl.$^2$ .............................................. H02P 3/00
[52] U.S. Cl. .................................... 318/471; 318/447; 318/473; 307/10 R; 307/117; 123/41.12
[58] Field of Search ............... 318/471, 473, 447, 484; 307/117, 10 R; 322/33; 123/41.12; 180/82 R

[56] References Cited

U.S. PATENT DOCUMENTS

| | | | |
|---|---|---|---|
| 3,794,896 | 2/1974 | Holt | 318/471 |
| 3,823,363 | 7/1974 | Hill | 180/82 R |
| 3,942,024 | 3/1976 | Ingham | 307/10 R |
| 3,964,444 | 6/1976 | Hemmann et al. | 322/33 |
| 3,982,163 | 9/1976 | Hill | 318/473 |
| 4,129,812 | 12/1978 | Shigenobu et al. | 318/484 |

Primary Examiner—J. V. Truhe
Assistant Examiner—M. K. Mutter
Attorney, Agent, or Firm—Stevens, Davis, Miller & Mosher

[57] ABSTRACT

Disclosed is an apparatus for controlling an electric motor for driving a cooling fan of an internal combustion engine. The apparatus comprises an engine operation detecting means, a timer, an engine temperature detecting means, a logical product generating means, and a motor controlling means. The electric motor is driven only when all of the following three conditions are satisfied: the engine is not operating; a predetermined timing period initiated when the engine stops operating has not expired; and a temperature in the engine room is higher than a predetermined value.

5 Claims, 4 Drawing Figures

APPARATUS FOR CONTROLLING AN ELECTRIC MOTOR FOR DRIVING A COOLING FAN OF AN INTERNAL COMBUSTION ENGINE

BACKGROUND OF THE INVENTION

The invention relates to an apparatus for controlling the driving of a cooling fan of a vehicle equipped with an internal combustion engine. More particularly, the invention relates to an apparatus for controlling an electric motor for driving an auxiliary cooling fan.

Cooling of an engine room of a vehicle equipped with an internal combustion engine is accomplished by streams of air supplied from a main cooling fan turned directly by the engine and by streams of air introduced from the outside by motion of the vehicle while the engine is operating. However, when both the motion of the vehicle and the operation of the engine are stopped, the temperature in the engine room becomes remarkably elevated because the above-mentioned air streams are not generated. Accordingly, a large amount of hydrocarbons is evaporated from the carburetor disposed in the engine room and from other members. This phenomenon is not at all welcomed in view of the strict exhaust gas control regulations and in view of high flammability. Moreover, abnormally high engine room temperatures are detrimental to the various kinds of equipments disposed in the engine room.

As a means for solving the problem of abnormally high temperatures in the engine room of conventional vehicles, an auxiliary cooling fan driven by an electric motor is disposed in the engine room independently from the main cooling fan. The auxiliary cooling fan is driven when the temperature in the engine room is elevated above a predetermined level. Accordingly, the temperature is controlled so that driving of the auxiliary fan is continued for a certain predetermined period even after the engine has stopped operating and after an ignition switch of the engine is closed.

According to this driving control system, however, even while the engine is operating, if the temperature in the engine room rises above the predetermined level, the auxiliary cooling fan is driven. Therefore, wearing of the auxiliary cooling fan and the driving motor is extreme and the problem of poor durability of the auxiliary cooling fan and motor arises. At present, it is desired to enhance the cooling capacity of an auxiliary cooling fan of this type. If the amount of air streams is increased by increasing the diameter of the fan, the above problem of poor durability becomes very serious. Moveover, the driving of the auxiliary cooling fan at an unnecessary time causes the problem of wasteful consumption of electric power.

BRIEF SUMMARY OF THE INVENTION

It is an object of the present invention to provide an apparatus for controlling the driving of an auxiliary cooling fan so that the durability of the auxiliary cooling fan for cooling an engine room can be increased.

Another object of the invention is to provide an apparatus for controlling the driving of a cooling fan so as to prevent the wasteful consumption of the electric power.

According to the present invention, the apparatus for controlling an electric motor for driving a cooling fan of an internal combustion engine comprises a means for detecting particular operation of the engine and for providing a signal of a predetermined logic level when the engine is ceases operation, and a means for carrying out a timing operation. This timing operation is initiated when the above-mentioned logic level signal is applied to the timing operation means, and is completed when a predetermined timing period has passed. During the timing operation, a signal of the aforementioned predetermined logic level is provided from the timing operation means. The apparatus further comprises a means for detecting the temperature in the engine room. This temperature-detecting means provides a signal of a predetermined logic level when the detected temperature is higher than a predetermined value. The apparatus still further comprises a means for providing a logic signal corresponding to logical product of all of the logic level signals and a means for controlling the operation of the motor for driving the cooling fan in the engine room, based on the logical product signal.

In the preferred embodiment, the means for detecting a particular operation of the engine consists of an ignition switch of the engine.

The apparatus, in a further preferred embodiment, comprises a means for supplying a power voltage to each of the other aforementioned means when the ignition switch is being opened. It is preferred that this voltage-supplying means comprises a magnetic relay having a self-latching contact. The magnetic relay is de-energized when the timing operation is completed.

The above and other related objects and features of the present invention will be apparent from the following description of the disclosure with reference to the accompanying drawings and from the appended claims which disclose the novelty of the invention.

In the drawings:

FIG. 1 is a block diagram showing the outline of an embodiment of the present invention, FIG. 2 is a circuit diagram showing circuits for working the embodiment shown in FIG. 1, FIGS. 3a and 3b are diagrams for explaining the operation of the embodiment shown in FIG. 1.

DETAILED DESCRIPTION

Figure 1:
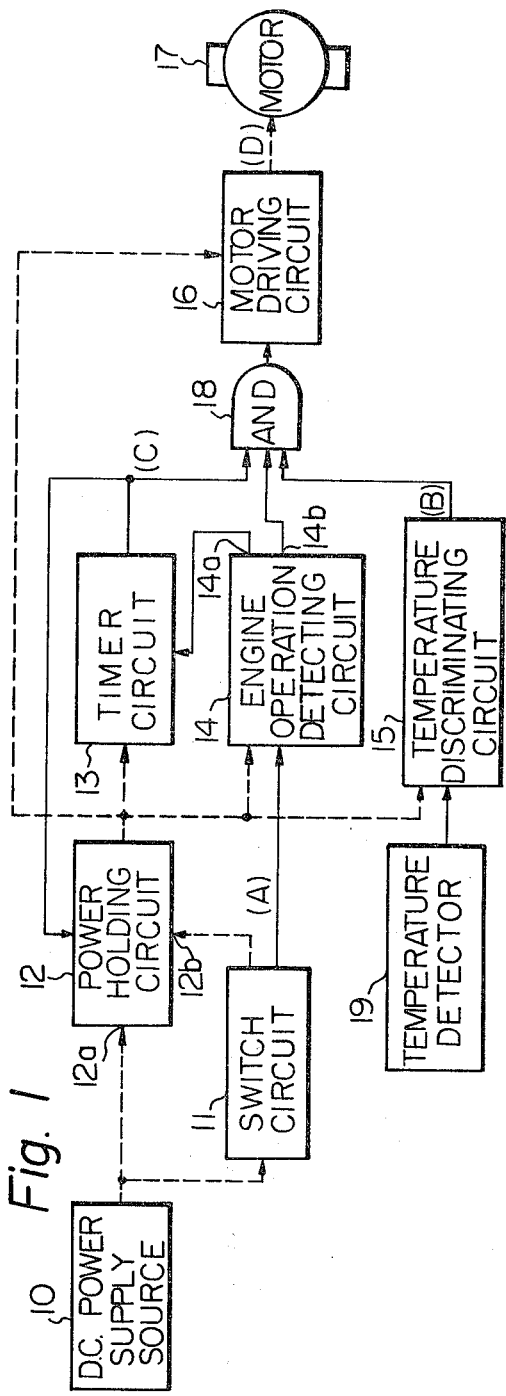

Referring to FIG. 1, a D.C. (direct current) power supply source 10 is, for example, a battery, equipped on an automobile. An output terminal of this power supply source 10 is connected to an input terminal of a switch circuit 11 and to one power input terminal 12a of a power holding circuit 12. The switch circuit 11 is, for example, an ignition switch of an engine. This switch circuit 11 is operated under a closed condition when the engine is operating and under an opened condition when the engine is not operating. An output terminal of the switch circuit 11 is connected to a signal input terminal of an engine operation detecting circuit 14 and further connected to another power input terminal 12b of the power holding circuit 12. An output terminal of the power holding circuit 12 is connected to power input terminals of a timer circuit 13, the engine operation detecting circuit 14, a temperature discriminating circuit 15, and a motor driving circuit 16. A power supply terminal of the motor driving circuit 16 is connected to an input terminal of an electric motor 17. A rotation axis of the motor 17 is coupled with an auxiliary cooling fan (not shown) mounted in the engine room of a vehicle.

In FIG. 1, the broken lines are the above-mentioned power supply lines and the solid lines are signal lines.

One output terminal 14a of the engine operation detecting circuit 14 is connected to a control input terminal of the timer circuit 13, and another output terminal 14b of the engine operation detecting circuit 14 is connected to one input terminal of an AND gate 18. An output terminal of the timer circuit 13 is connected to another input terminal of the AND gate 18 and to a control input terminal of the power holding circuit 12. A signal input terminal of the temperature discriminating circuit 15 is connected to an output terminal of a temperature detector 19 mounted in the engine room. An output terminal of the temperature discriminating circuit 15 is connected to still another input terminal of the AND gate 18. An output terminal of the AND gate 18 is connected to a control input terminal of the motor driving circuit 16.

The engine operation detecting circuit 14 is provided for detecting whether or not the engine is operating. In this embodiment, this circuit 14 detects whether the switch circuit 11 is closed or opened, and then supplies a high level signal or a low level signal according to the result of such detection. More specifically, when the switch circuit 11 is closed, a low level signal appears on the output terminal 14b and a high level signal or a low level signal appears on the other output terminal 14a. When the switch circuit 11 is opened, a high level signal appears on the output terminal 14b and a signal inverted to the signal appearing when the switch circuit 11 is closed appears on the output terminal 14a.

The timer circuit 13 is activated when a starting signal is applied to the control input terminal thereof, and then produces a high level signal during a predetermined timing period. At the end of the timing period, the timer circuit 13 trips and then produces a low level signal at the output terminal thereof. The above-mentioned starting signal is a signal supplied from the engine operation detecting circuit 14 corresponding to the "open" state of the switch circuit 11. Accordingly, the timer circuit 13 is arranged so that it is activated when the switch circuit 11 is opened.

The temperature detector 19 generates a signal having a voltage level corresponding to the value of the temperature in the engine room. The temperature discriminating circuit 15 compares the voltage level of the output signal of the temperature detector 19 with a predetermined value, and then provides the result of the comparison. More specifically, when the value of the temperature in the engine room is higher than a predetermined value of the temperature, the circuit 15 produces a high level signal from the output terminal thereof, and when the value of the temperature in the engine room is lower than the predetermined value of the temperature, the circuit 15 produces a low level signal from the output terminal thereof.

The motor driving circuit 16 is arranged so that an electric power is supplied to the motor 17 only when a high level signal is applied from the AND gate 18.

The power holding circuit 12 activates and supplies electric power when the switch circuit 11 is closed and the power voltage is applied to the power input terminal 12b of the power holding circuit 12. In other words, when the switch circuit 11 is closed, the power holding circuit 12 receives a power source voltage through the power input terminal 12a and supplies electric power to each of the above-mentioned circuits. This power-supplying operation is continued until a stop signal is applied from the timer circuit 13, even when the switch circuit is opened. In this embodiment, the stop signal signals a change from a high level signal to a low level signal, such signal being applied to the control input terminal of the power holding circuit 12 from the timer circuit 13.

Thus, the power-supplying operation is stopped after the engine has been stopped and the predetermined timing period of the timer circuit 13 has passed.

In the case where each of the foregoing circuits is operated as mentioned above, a high level signal will appear on the output terminal of the AND gate 18, only when all of the following three conditions are satisfied. As a result, the electric motor 17 is rotated to turn the auxiliary cooling fan. The three conditions to be satisfied are stated as follows.

(1) The engine must be stopped. Namely, in this event, the switch circuit 11 is in the "Open" state.

(2) A predetermined timing period must not pass from the moment when the engine is stopped. Namely, in this event, the output signal of the timer circuit 13 is a high level signal.

(3) The temperature in the engine room must be higher than the predetermined value. Namely, in this event, the output signal of the temperature discriminating circuit 5 is a high level signal.

Figure 3A:
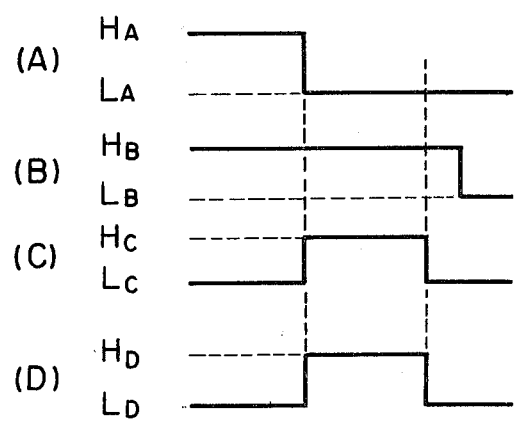
Figure 3B:
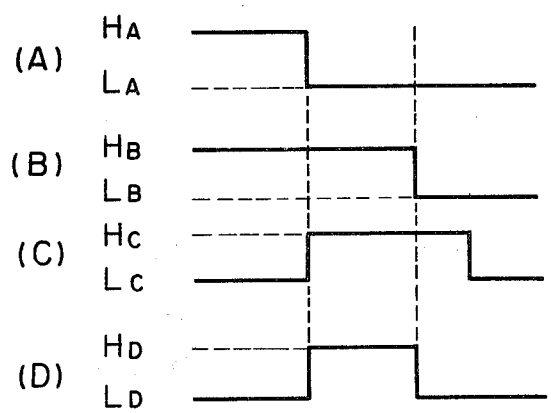

The operation illustrated hereinbefore will now be described with reference to FIGS. 3a and 3b. In these figures, the reference letter (A) represents the level of the output signal of the switch circuit 11. As mentioned above, this level of the output signal of the switch circuit 11 corresponds to the operation state of the engine. Namely, when the engine is in the running state, the level of this signal is a high level $H_A$, and when the engine is not in the running state the level of this signal is a low level $L_A$. The reference letter (B) designates the level of the output signal of the temperature discriminating circuit 15. Accordingly, a high level $H_B$ represents the level of the output signal of the temperature discriminating circuit 15 when the temperature in the engine room is greater than the predetermined value, and a low level $L_B$ represents the level of this signal when the temperature in the engine room is less than the predetermined value. The reference letter (C) designates the level of the output signal of the timer circuit 13. Accordingly, a high level $H_C$ corresponds to the level of the output signal of the timer circuit when the timing period has not elapsed, and a low level $L_C$ corresponds to the level of this signal when the timing period has elapsed. Furthermore, the reference letter (D) designates the level of the output signal of the AND gate 18. When the level of this signal is a high level $H_D$, the motor 17 for driving the auxiliary cooling fan is rotated, and when the level of this signal is a low level $L_D$, the motor 17 is stopped.

The arrangement and the operation of the apparatus according to the present embodiment will be described in detail by referring to specific examples of circuits shown in FIG. 2. In the apparatus shown in FIG. 2, the power holding circuit comprises as main elements an electromagnetic relay $RL_1$ having a normally open contact and a switching transistor $Tr_1$ connected in series to an exciting coil of the electromagnetic relay $RL_1$. When an ignition switch 20 of the engine is closed, a voltage from a battery 21 is applied to a base of the transistor $Tr_1$ through a diode $D_1$ and a resistor $R_1$ to turn on the transistor $Tr_1$, whereby the electromagnetic relay $RL_1$ is actuated to close the contact thereof. Thus, the voltage from the battery 21 does not pass through the ignition switch 20 but is supplied to the exciting coil of the electromagnetic relay $RL_1$ through the contact of the electromagnetic relay $RL_1$. Accordingly, the relay RL₁ keeps the contact latched on, and electric power is supplied to each circuit through the contact of the relay RL₁. The timer circuit comprises as the main element, a comparison circuit including a condenser C, resisters R₂ and R₃, transistors Tr₃ and Tr₄, and an operational amplifier OP₁. When the ignition switch 20 is closed, the condenser C is charged until the voltage across the terminal thereof is elevated to a value defined by a Zener diode D₂. At the same time, a current provided from the battery 21 flows through a register R₂, transistors Tr₃ and Tr₄ and a resistor R₃. Therefore, the electric potential of a non-inverting input terminal (point a) of the operational amplifier OP₁ is increased and then the level of the output of the operational amplifier OP₁ is changed to a high level. Since this high level signal is applied to the base of the transistor Tr₁ through a diode D₃ and the resistor R₁ even if the ignition switch 20 is opened, the self-latching operation of the contact of the relay RL₁ is maintained.

In the apparatus of the present embodiment, since the battery voltage fed through the ignition switch 20 is used directly as a signal indicating the engine operation, no particular engine operation detecting circuit is disposed except a circuit for inverting the signal level which comprises a switching transistor Tr₂. When the ignition switch 20 is closed, the electric potential of the collector of the transistor Tr₂, namely the point b, is maintained at a low level because the transistor Tr₂ is turned on. Accordingly, when the ignition switch 20 is closed, the potential of the output terminal of the AND gate comprising diodes D4, D5 and D6 and resistor R4, namely the electric potential of the point c, is maintained at a low level, a switching transistor Tr₅ is turned off, and an electromagnetic relay RL₂ having a normally open contact is not actuated. Therefore, in this case a motor 22 is not rotated.

The temperature in the engine room is detected by a thermistor 23 constituting the temperature detector. The voltage between both terminals of the thermistor 23, which corresponds to the value of the detected temperature, is compared with a predetermined voltage by a comparision circuit including an operational amplifier OP₂, which constitutes the temperature discriminating circuit. Accordingly, when the temperature in the engine room is higher than the predetermined value, the output signal of the operational amplifier OP₂ is maintained at a high level, and when the temperature in the engine room is lower than the predetermined value, the output signal of the operational amplifier OP₂ is maintained at a low level.

When the ignition switch 20 is opened, the transistor Tr₂ is turned off and the electric potential at the point b is maintained at a high level. From the point when the ignition switch 20 is opened, the charge stored in the condenser C is gradually discharged through a resistor R₂, transistors Tr₃ and Tr₄ and a resistor R₃. With this gradual discharge, the electric potential at the point a is gradually lowered.

When this potential is lowered to a predetermined voltage level, the output signal of the operational amplifier OP₁ is changed to a low level output. The period between the moment of opening of the ignition switch 20 and the inverting moment of the output signal of the operational amplifier OP₁ corresponds to the predetermined timing period. This period is determined by the time constant of the discharge circuit of the condenser C and the reference voltage of the comparison circuit. In general, the timing period is set for about 30 minutes.

When a longer timing period is required, field effect transistors (FET) are used as the transistors Tr₃ and Tr₄.

If the ignition switch 20 is opened, the electric potential of the point c is maintained at a high level and the transistor Tr₅ remains in the ON state so long as the temperature in the engine room is higher than the predetermined value. Therefore, the relay RL₂ is actuated to close the contact, and the motor 22 is then driven to turn on the auxiliary cooling fan, when the predetermined timing period has not passed. After the predetermined timing period has elapsed, the level of the output of the operational amplifier OP₁ is lowered as pointed out hereinbefore, and also the level of the electric potential at the point c is lowered. As a result, the motor 22 in this case is not driven. Further, even within the predetermined timing period, if the temperature in the engine room is lowered below the predetermined value, the output signal of the operational amplifier OP₂ is lowered and the electric potential at the point c is lowered. As a result, the operation of the motor 22 is stopped.

When the predetermined timing period has passed and the output of the operational amplifier OP₁ is lowered, the operation of the motor 22 is stopped as pointed out above, and also the electric potential of the base of the transistor Tr₁ is lowered. Accordingly, the transistor Tr₁ is turned off and the contact of the relay RL₁ is opened to release the self-latching operation. Namely, supply of the electric power to each of the circuits of the apparatus of the present embodiment is completely stopped until the ignition switch is closed again.

Figure 2:
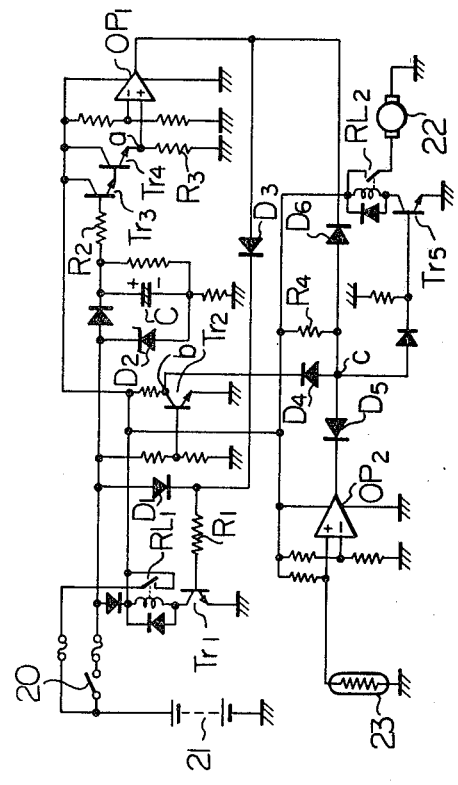

The temperature detector is not limited to a thermistor as shown in FIG. 2, but a combination of a bimetal element and a switch element can be used as the temperature detector. In this case, provision of the temperature discriminating circuit such as the above-mentioned comparison circuit may be omitted.

As will be apparent from the foregoing illustration, when the control apparatus of the present invention is used, the auxiliary cooling fan is controlled so that it is not turned on while the engine is operated. Accordingly, in the present invention, the durability of either the auxiliary cooling fan or the motor for driving this auxiliary cooling fan can be increased. Moreover, a cooling fan having a high cooling effect can be freely adopted. Still further, wasteful consumption of electric power can be prevented.

As many widely differing embodiments of the present invention may be made without departing from the spirit and scope of the present invention, it should be understood that the invention is not limited to the specific embodiment described in the specification except as defined in the appended claims.

What is claimed is:

1. An apparatus for controlling an electric motor for driving a cooling fan of an internal combustion engine, comprising:
    means for detecting the operation of said engine, said engine operation detecting means providing a first signal of a predetermined logic level when said engine is not operating;
    timing means for performing a timing operation initiated when said first signal is applied thereto and lasting until a predetermined timing period has passed, said timing means providing a second signal of said predetermined logic level during said timing operation;

means for detecting a temperature in an engine room of said engine, said temperature detecting means providing a third signal of said predetermined logic level when the value of the detected temperature is higher than a predetermined value; and, means for energizing said electric motor for driving said cooling fan only when all of said first, second and third signals are applied thereto.

2. An apparatus as claimed in claim 1, comprising means for supplying a power voltage to said means for detecting engine operation, said timing means, said means for detecting a temperature, and said means for energizing when said engine is not operating, said power supply means ceasing the power supplying operation when said timing operation of said timing means ends.

3. An apparatus as claimed in claim 2, wherein said engine operation detecting means comprises means for detecting that an ignition switch of said engine is opened.

4. An apparatus as claimed in claim 3, wherein said motor energizing means comprises a gate means for providing a logical product signal corresponding to a logical product of all of said first, second and third signals, and a relay switch energized in response to said logical product signal so as to energize said electric motor.

5. An apparatus as claimed in claim 4, wherein said power supply means comprises a self-latching magnetic relay switch having an exciting coil and normally open contacts, said exciting coil being energized so as to close said contacts only when said second signal is being generated, said contacts being connected between a battery of said engine and said relay switch of said motor energizing means.

* * * * *